United States Patent [19]
Thompson et al.

[11] Patent Number: 5,653,832
[45] Date of Patent: *Aug. 5, 1997

[54] APPLICATOR FOR FILAMENTS

[75] Inventors: Allen C. Thompson, Castro Valley; Reynaldo F. Medel, Milpitas; Edward N. Berticevitch, San Jose; Rodger A. Moody, Castro Valley, all of Calif.

[73] Assignee: Portola Packaging, Inc., San Jose, Calif.

[*] Notice: The term of this patent shall not extend beyond the expiration date of Pat. No. 5,601,669.

[21] Appl. No.: 435,140

[22] Filed: May 5, 1995

Related U.S. Application Data

[63] Continuation-in-part of Ser. No. 317,561, Oct. 4, 1994, Pat. No. 5,601,669.

[51] Int. Cl.$^6$ ............................................. B32B 31/16
[52] U.S. Cl. .................. 156/73.1; 156/580.1; 264/445; 425/174.2; 493/87; 493/213; 493/929
[58] Field of Search .................. 156/69, 73.1, 73.5, 156/580.1, 580.2; 425/174.2; 493/213, 929, 87; 264/442, 443, 445

[56] References Cited

U.S. PATENT DOCUMENTS

| | | | |
|---|---|---|---|
| 4,566,928 | 1/1986 | Rausing | 156/217 |
| 4,604,850 | 8/1986 | Reil | 53/423 |
| 4,788,811 | 12/1988 | Kawajiri et al. | 53/426 |
| 4,909,434 | 3/1990 | Jones et al. | 229/125 |
| 4,964,562 | 10/1990 | Gordon | 229/125.15 |
| 5,174,465 | 12/1992 | Luch et al. | 220/288 |
| 5,203,819 | 4/1993 | Gleason | 493/87 |
| 5,219,320 | 6/1993 | Abrams et al. | 493/8 |
| 5,249,695 | 10/1993 | Luch et al. | 220/276 |
| 5,272,855 | 12/1993 | Togi et al. | 53/410 |
| 5,304,265 | 4/1994 | Keeler | 156/64 |
| 5,484,374 | 1/1996 | Bachner et al. | 493/87 |

FOREIGN PATENT DOCUMENTS

| | | | |
|---|---|---|---|
| 2645503 | 10/1990 | France | 493/213 |

*Primary Examiner*—James Sells
*Attorney, Agent, or Firm*—Julian Caplan; Flehr, Hohbach, Test, Albritton & Herbert

[57] ABSTRACT

A fitment comprising a pouring spout having a peripheral flange at one end and a closure at a second end is attached to a paperboard carton formed with a hole in a side panel. The carton is moved intermittently along a conveyor, such as that used in a filling machine. An arm having a spud oscillates about a horizontal axis parallel to the conveyor. The arm is pivoted to down position as the carton reaches the fitment attaching station so that the fitment enters the open end of the carton with the spud aligned with the carton hole. The arm is mounted on a first carriage which reciprocates horizontally in a first direction to project the closure through the hole until the flange abuts the inside of the carton panel. An ultrasonic welding horn is mounted on a second carriage which reciprocates in alignment with the first carriage in a second direction opposite the first direction. The horn welds the fitment flange to the inside of the carton panel.

53 Claims, 7 Drawing Sheets

APPLICATOR FOR FILAMENTS

CROSS REFERENCE TO RELATED APPLICATION

This application is a continuation-in-part of assignee's patent application Ser. No. 08/317,561 filed Oct. 4, 1994, U.S. Pat. No. 5,608,669, entitled APPARATUS AND METHOD FOR ATTACHING FITMENT TO CARTONS.

BACKGROUND OF THE INVENTION

1. Field of the Invention

This invention relates to a new and improved method and apparatus for applying fitments to cartons. More particularly, the invention relates to apparatus and method for ultrasonically welding a plastic fitment (comprising a pouring spout having a flange at one end thereof) to a paperboard carton of the type used to package milk and other products. In accordance with the invention, the fitment is inserted into an open end of the carton into alignment with a hole formed in a wall of the carton, moved laterally until the closure end of the spout extends through the hole in the carton wall and the flange abuts the inside of the carton wall and then welded to the interior of the carton wall.

A feature of the invention is that fitments are applied simultaneously to two cartons side by side on a single filler machine conveyor.

2. Description of Related Art

Fitments of the general types used with the present invention are known in the art. Examples of improved fitments of this type are shown in U.S. Pat. Nos. 5,174,465 and 5,249,695, owned by the assignee of this application, among others.

Paperboard cartons of the general type used in conjunction with the present invention are commonly used for packaging milk, juice, and other products. Heretofore flanges of fitments used with such cartons have been welded either to the inside or the outside of the walls of such cartons by ultrasonic welding.

An important advantage in using fitments on such cartons is that they facilitate dispensing the carton contents. Cartons which do not use such fitments require opening the upper end of the tent-type closure, which is a task of some difficulty.

SUMMARY OF THE INVENTION

In a preferred embodiment of the present invention apparatus is provided for attaching to a paperboard carton, in a condition of its fabrication wherein the upper end is open and the sides are erected in rectangular tubular form and wherein one wall is formed with a pre-punched hole, of a thermoplastic fitment having a spout formed with a peripheral flange at one end.

The apparatus of the invention is installed as one station on a dual paperboard carton filling line such as, for example, Tetra Pak TR/7. In such line, two cartons proceed intermittently in tandem along a single conveyor to a fitment applying station. The apparatus is mounted on a base which is, in turn, mounted above the intermittently moving carton conveyor.

The present invention simultaneously applies fitments to two cartons which are positioned side by side on a single conveyor. Reciprocating in a transverse horizontal direction is a first carriage on which is pivotally mounted a pair of Z-shaped arms. Mounted on one end of each arm is a spud which in its upper position (approximately 30° above horizontal) is positioned to receive a fitment as it is pushed out of a fitment discharge box. The arm is then pivoted downwardly until the axis of each fitment is horizontal and is positioned inside the open end of one of the cartons. The first carriage is then moved horizontally so that an end of each fitment is pushed through the hole in one of the carton-panel walls until the flange on the fitment engages the inside of the carton wall. A pair of ultrasonic welding horns is mounted on a pair of second carriages in direct alignment with the holes in the cartons and the horns are moved in a direction opposite the movement of the first carriage so that the horns engage the outsides of the carton panels opposite the fitment flanges and ultrasonically weld the fitments to the cartons.

The above arrangement is subject to variation. Thus there may be two first carriages or there may be a single second carriage.

It sometimes occurs that through malfunction one or both cartons of a pair may be missing. In such cases it is desirable that no fitment be delivered to the spud corresponding to the missing carton and that the welding horn for that particular carton not be advanced or not be actuated. In the preferred embodiment there are one first carriage and two second carriages.

One of the features of the present invention is that space requirements are minimal so that a simple apparatus hereinafter described may accommodate two cartons side-by-side on a single filling line.

In accordance with the present invention, a pair of tubular rectangular cartons each having at least one open end and formed with a hole in a side wall adjacent the open end are deposited on a single conveyor in a filling line which carries the cartons intermittently to a fitment insertion station where the fitments are positioned in the cartons in alignment with the holes, moved so that the ends of the fitments project out through the holes, and the flanges are welded to the insides of the cartons.

A principal advantage of the present invention is the facility with which fitments may be installed on the spuds, inserted into the open ends of the cartons, positioned with the ends of the fitments protruding out through the holes in the cartons and the flanges welded to the inside walls of the cartons. This is particularly important when the cartons are of small capacity and require a short filling time interval. The present invention speeds up the fitment attachment time so that the cartons move fast enough to keep up with the filling interval.

Another principal advantage of the present invention is that the machine may be installed in a carton filling machine so that the attachment of fitments occurs during the same dwell period as the cartons are filled. Accordingly the present invention requires little or no alteration or timing adjustment of a conventional filler machine with which it is used even when the speed of the filler is changed by the operator.

One important advantage of this invention is that the cartons may be erected and fitments welded thereto with minimal modification of a standard filler.

A principal advantage of the present invention is that it enables two cartons to be handled simultaneously on a single conveyor line. This has obvious advantages in reducing the size of the apparatus.

Another feature of the invention is the shape of the Z-shaped arms on which the spuds which receive the fitments are mounted. Such arms are mounted for rapid oscillation on a reciprocating first carriage. The shape of each arm enables the spud thereon to fit into the open end of the carton when the carton is stationary. Further, the shape of the arm is such that there is no problem of clearance with the upper edge of the carton. The end of the Z-shaped arm opposite the spud is positioned to contact shock absorbers at either end of its cycle of movement of the arm to cushion the shock of rapid oscillation. Since shock absorbers fail and leak fluid, a feature of the invention is that they are located so that contaminants do not leak into the cartons. Further, the shock absorbers move with the arms (i.e., with the first carriage) and are less subject to damage.

Modern fillers use filtered air to reduce contamination of the cartons. Another advantage of the present invention is that the apparatus does not contaminate the filtered airspace of the filler and may be installed within the enclosure of the filler.

Another advantage of the present invention is that insertion and welding may be accomplished at the rate of 3000 per hour in each of two cartons on the conveyor line of the filling machine.

Still another feature of the invention is the facility with which components which engage the fitments or enter the cartons may be removed for special sanitation when the line is down for cleaning periodically.

The spud fitting into the fitment and the back up for the flange thereof are one piece. Hence they may be removed from the arm on which they are mounted for cleaning. Since they are of one piece there is no space between the parts in which contaminants may collect.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENT

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Components

Figure 1:
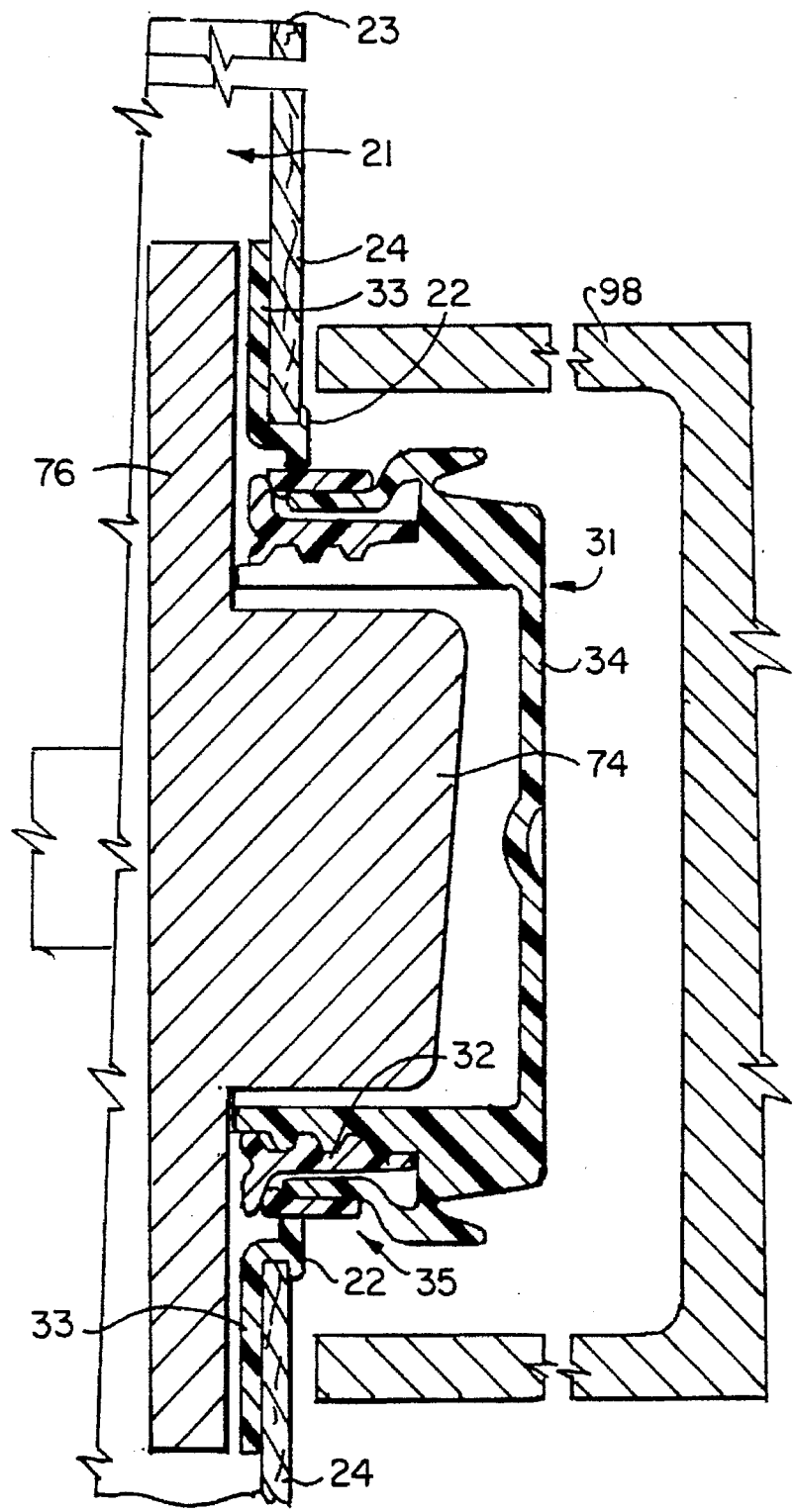
FIG. 1 is an enlarged vertical sectional view of a carton and fitment with apparatus parts included.
Figure 2:
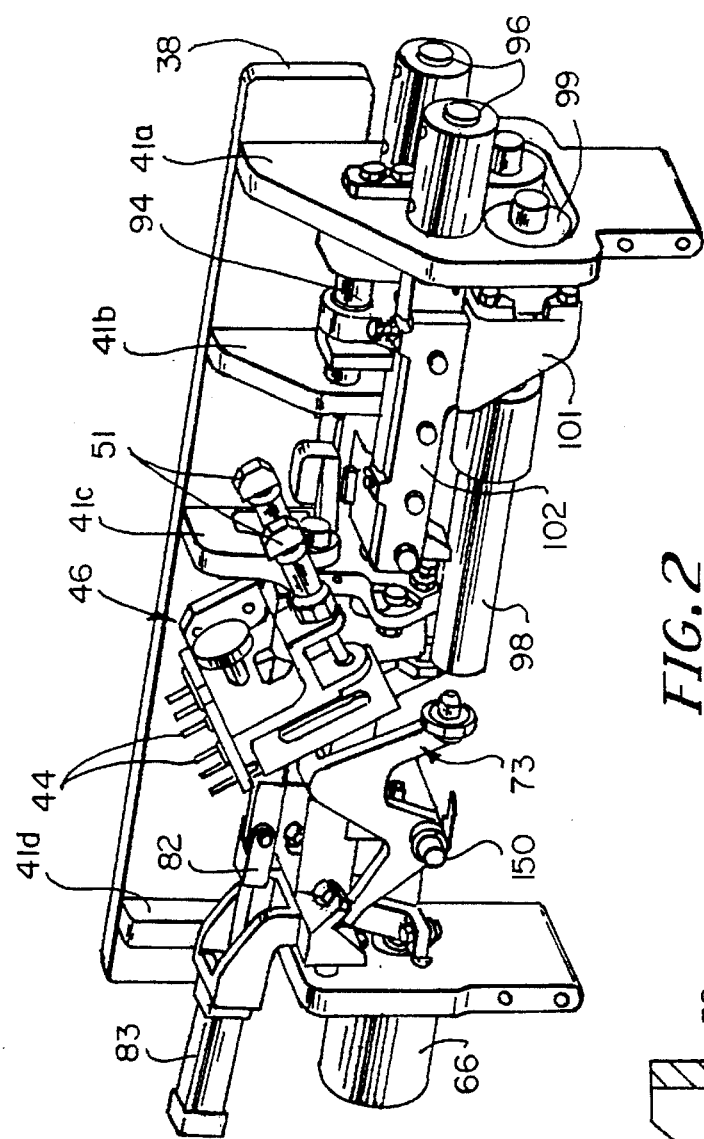
FIG. 2 is a perspective view of the apparatus.
Figure 3:
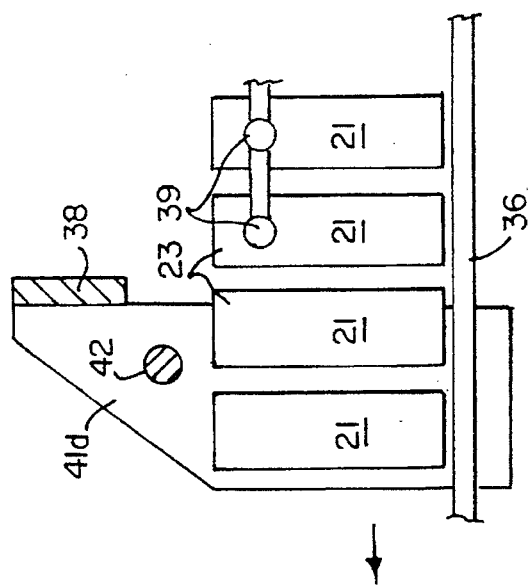
FIG. 3 is a schematic end elevational view of the apparatus.

Carton 21, shown schematically in FIGS. 1 and 3, prior to handling by the apparatus of the present invention, has been erected from a blank of coated paperboard into a rectangular tubular shape, and may be closed at the bottom but open at the top 23. Hole 22 is formed spaced downward from upper end 23 of apertured side panel 24. It will be understood that after the fitment 31 has been welded thereto, the carton 21 is transported to a filling station where the carton is filled and the upper end 23 is formed into a conventional tent-like closure, well known in the art. The hole 22 (and the fitment 31 applied thereto by the apparatus of the present invention) are located on one of the sloping portions of the completed carton.

Fitment 31 is formed of a thermoplastic material and comprises a spout 32 having a peripheral flange 33 at one end and a closure 34 at the opposite end. Tamper evident means 35 detects tampering with the fitment after it has been applied. The fitment 31 is subject to considerable variation. Suitable fitments are illustrated and described in assignee's U.S. Pat. Nos. 5,174,465 and 5,249,695. Other fitments may be used.

Apparatus

Figure 4:
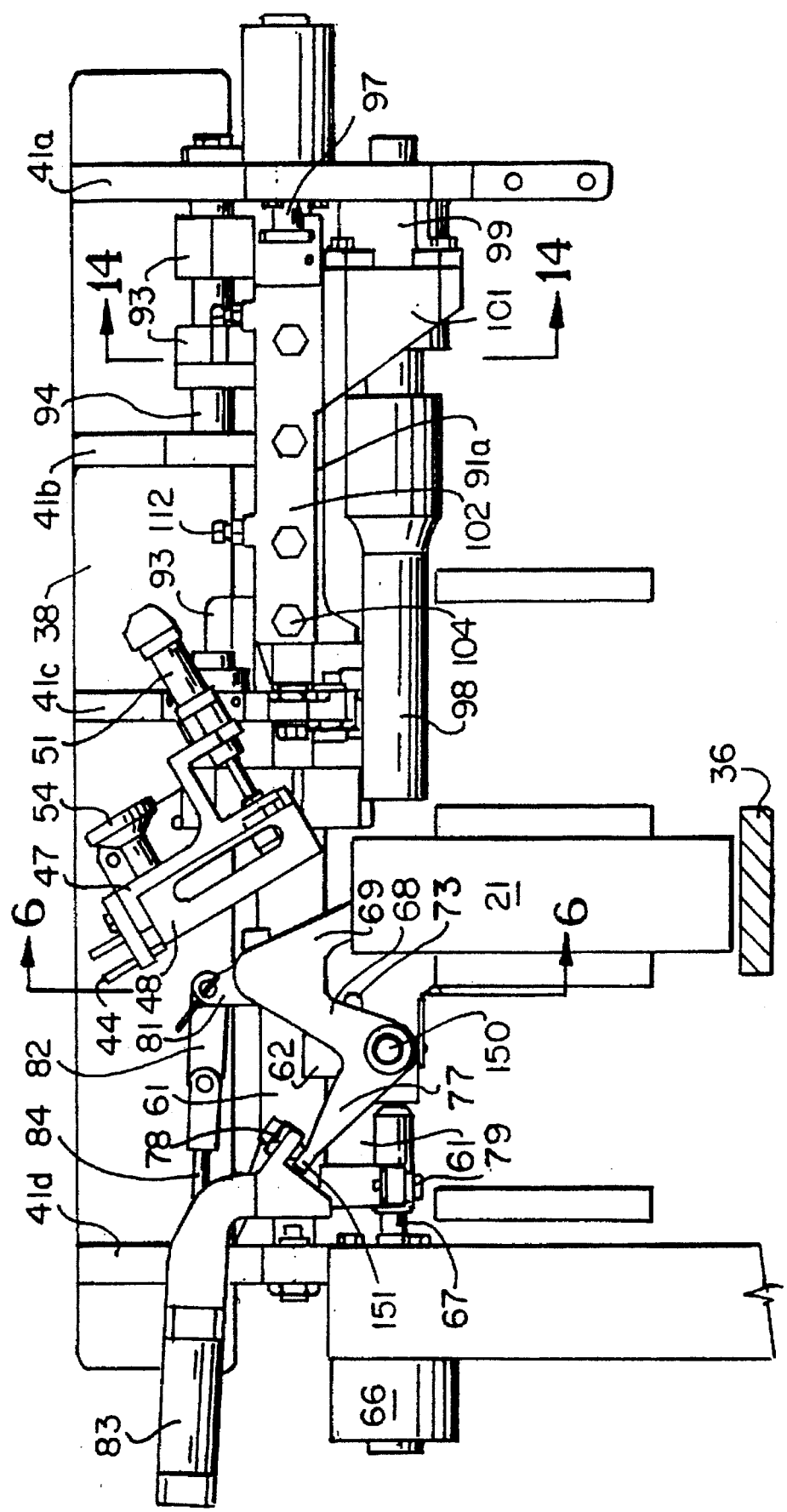
FIG. 4 is an enlarged side elevational view thereof.
Figure 5:
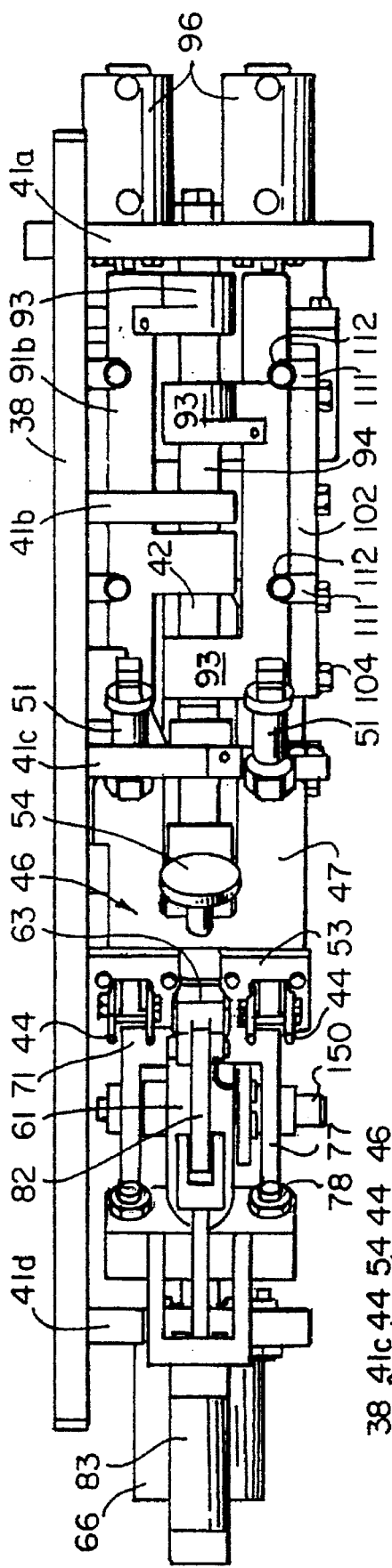
FIG. 5 is a top plan view in reduced scale.
Figure 7:
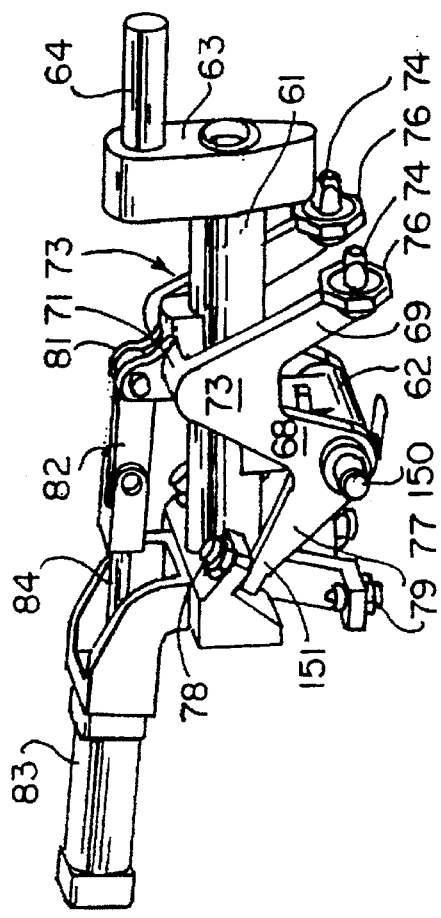
FIG. 7 is a perspective view of a portion of FIGS. 3–6.
Figure 6:
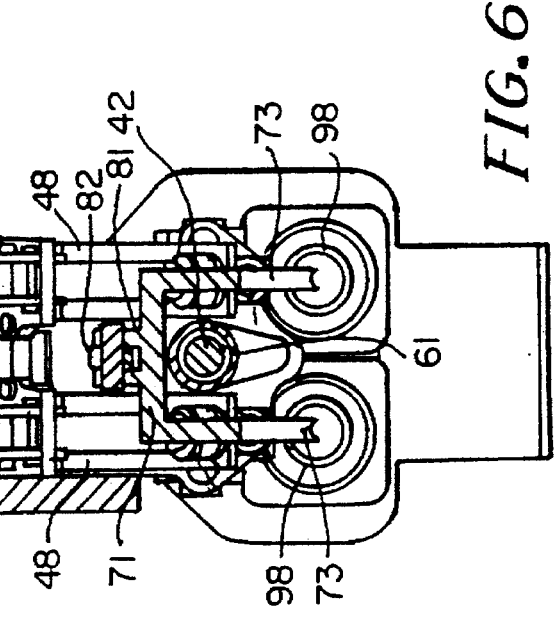
FIG. 6 is a sectional view taken along line 6—6 of FIG. 4.

As heretofore mentioned, the present invention is installed in a paperboard carton filling line such as Tetra Pak TR/7, wherein a horizontal conveyor 36 of well known construction advances two cartons 21 side-by-side intermittently in a longitudinal direction transverse to the plane in which FIG. 4 is taken. Such arrangement is shown schematically in FIG. 3. At an earlier station, sensors 39 sense absence of one or both cartons 21 of a pair to deactivate application function. The apparatus of the present invention is attached to the structure of the filler machine by means of back plate 38. The apparatus extends longitudinally a distance less than the longitudinal conveyor advance and transversely within the enclosure of the filler (not shown). Extending forwardly from plate 38 are brackets 41 (here shown as four in number and designated 41a, 41b, 41e and 41d) which support main shaft 42 which functions as a way along which other parts of the apparatus, as hereinafter explained, reciprocate.

Deposit of Fitments on Spud

Figure 8:
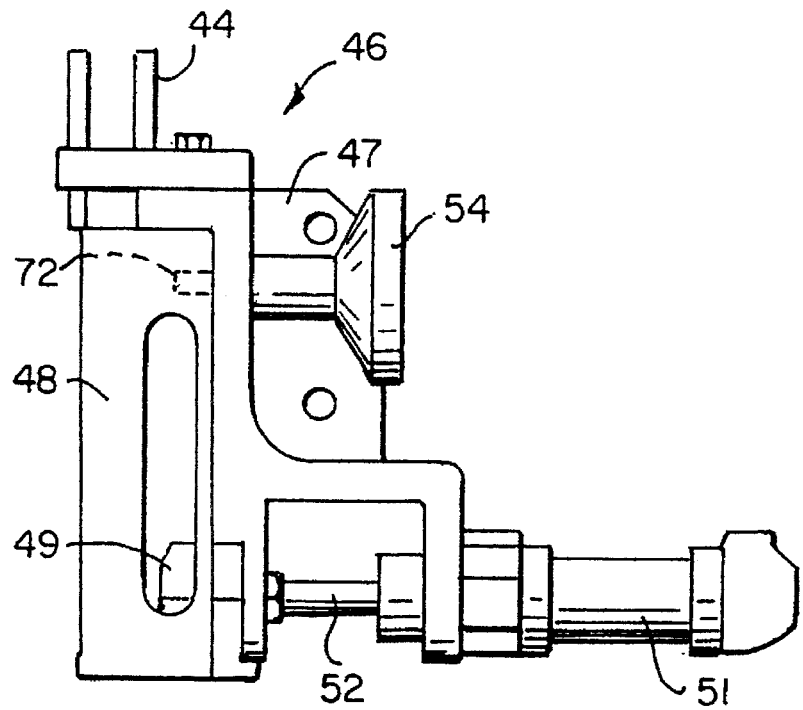
FIG. 8 is a side elevational view of the fitment box.
Figure 9:
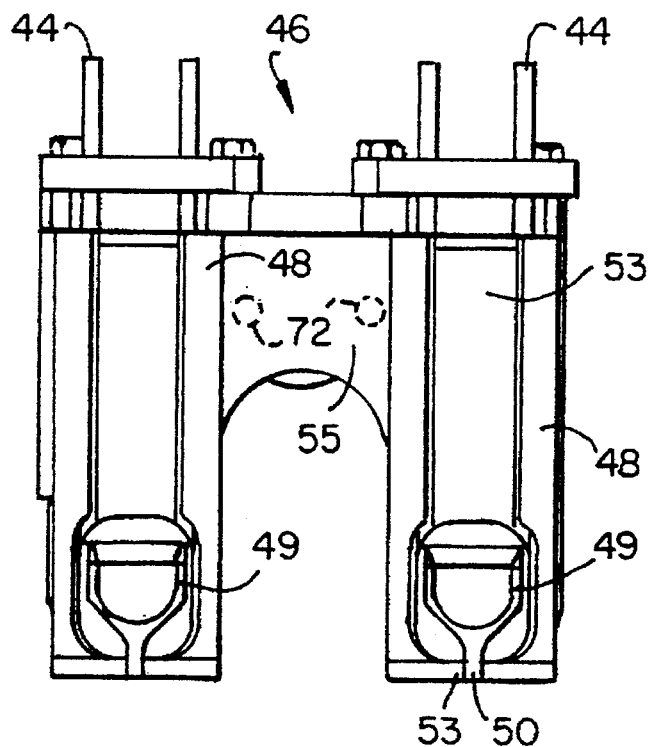
FIG. 9 is an end elevational view of the structure of FIG. 8.
Figure 10:
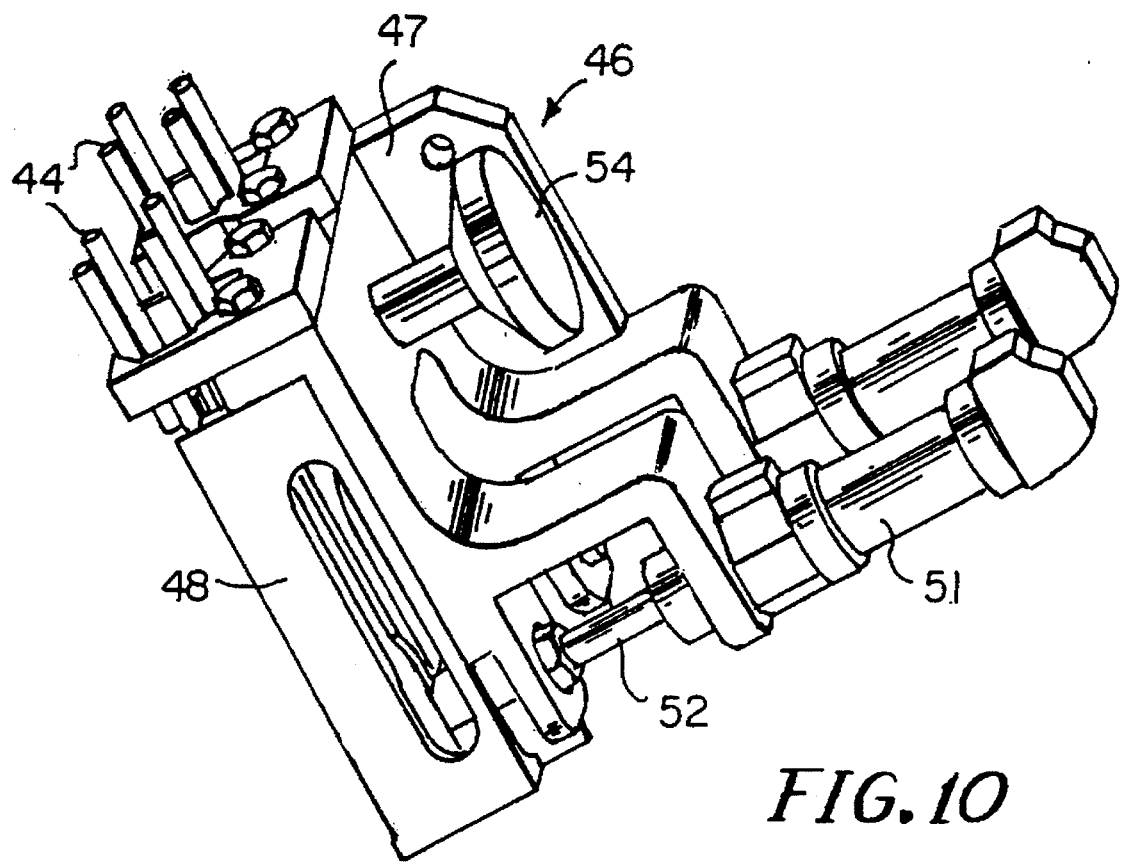
FIG. 10 is a perspective view of a portion of the structure of FIGS. 8 and 9.
Figure 11:
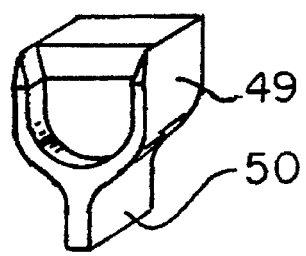
FIG. 11 is an enlarged perspective view of a cup to support a fitment used in the structure of FIGS. 8 and 9.
Figure 12:
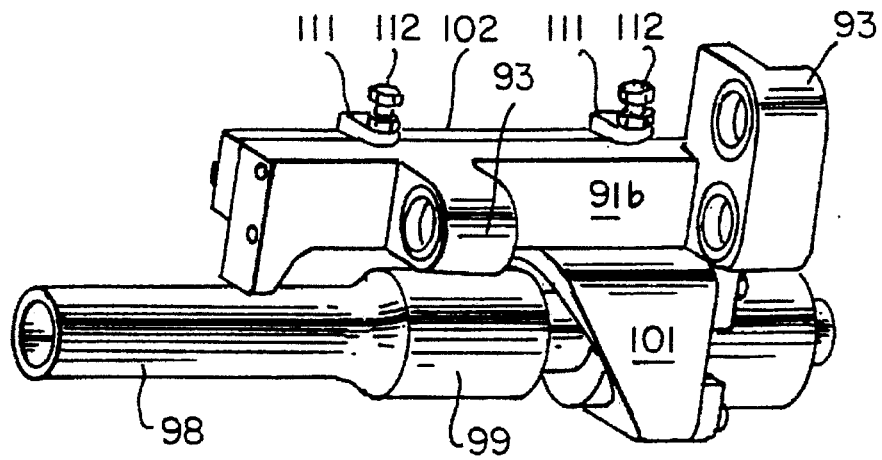
FIG. 12 is a perspective view of one of the welding horns and its carriage.
Figure 13:
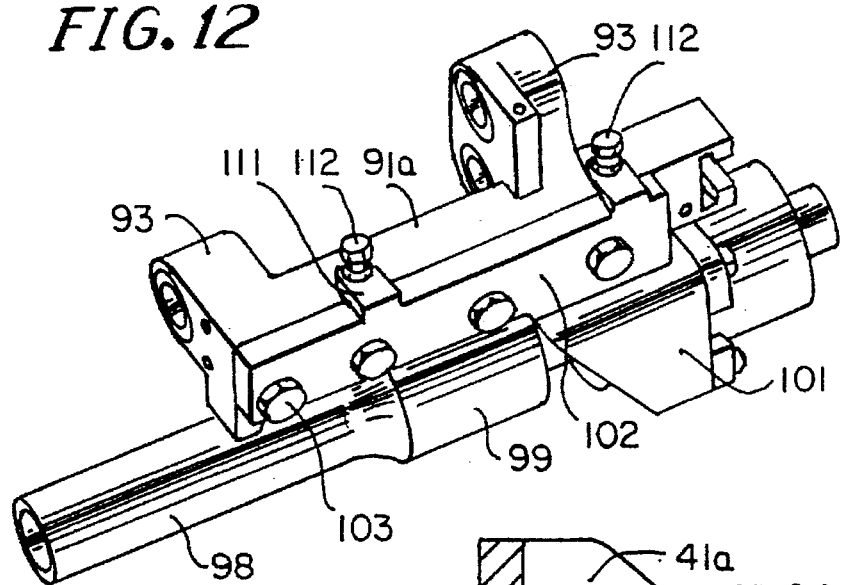
FIG. 13 is a view similar to FIG. 12 of the other welding horn and its carriage.
Figure 14:
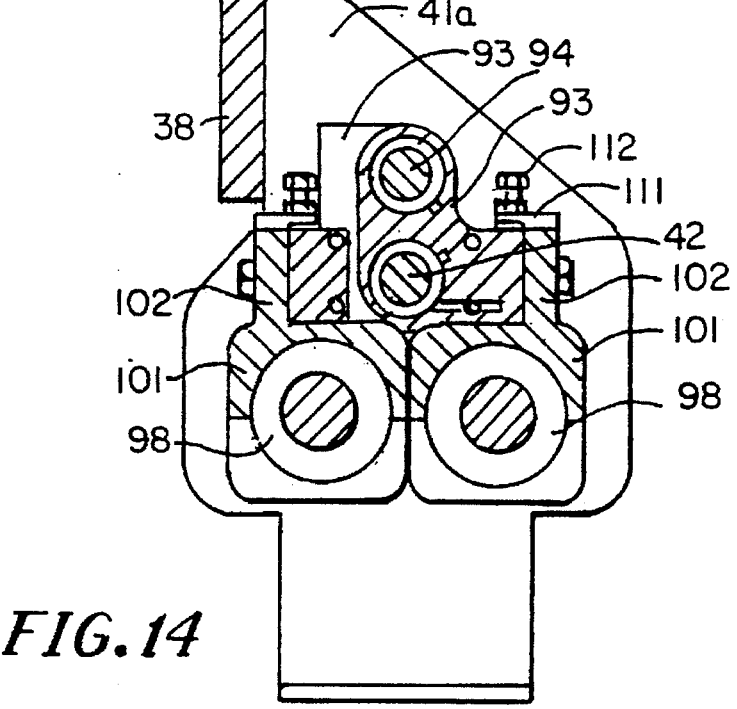
FIG. 14 is a sectional view taken substantially along line 14—14 of FIG. 4.

Wire fitment chute conveyors 44 convey two lines of fitments 31 from a superimposed hopper (not shown) to a conveyor discharge box or terminus 46 shown particularly in FIGS. 8–9. Box bracket 47 is fixed to base plate 38. To the left of bracket 47 are cap nests 48 which hold vertical stacks of fitments 31. Nest 48 has an apertured top 53 through which the fitments pass. Mounted on the box 46 are air cylinders 51, the plungers 52 of which are positioned to push the last fitments in box 46 to the left as shown in FIG. 8. Each plunger 52 extends through a hole in the right side of the box and when cylinder 51 is actuated pushes a fitment 31 out of the box 46 through a hole in the left side of the box for a purpose hereinafter explained. As each fitment is pushed out of the box, the next moves by gravity into discharge position. If, for some reason, one or both cartons are missing on the conveyor, such absence is detected by sensors 39, and one or both cylinders 51 is not activated. It will be understood that feed means other than air cylinders 51 may be used to discharge fitments from box 46.

Fixed to the distal end of each plunger 52 is a cup 49 open at the top and also open opposite plunger 52. Thus the lowermost fitment 31 in nest 48 is received in cup 49. To maintain cup 49 in upright position it is formed with a depending tail 50 which slides in a vertical slot 53a in the bottom of nest 48. Cup 49 keeps the fitment 31 held therein in position upon transfer from nest 48 onto spud 74 as hereinfor explained.

Since nest 48 may contaminate fitments 31, it is preferably removable for sanitation. Thus hand screw 54 turnable in box bracket 47 is threaded into crosspiece 55 joining the two nests 48. Pins 72 extend from bracket 47 into holes in crosspiece 55 to maintain alignment.

Application of Fitments in Cartons

First carriage 61 is mounted on the left side of the apparatus as viewed in FIG. 4. Carriage 61 reciprocates on horizontal shaft 42 mounted on brackets 41 extending outward from backplate 38. For such purpose elongate carriage 61 includes an upward extending member 63 having a sleeve bearing (not shown) sliding on shaft 42 and a downward projecting member 62 which is attached to rod 67 of double-acting horizontal air cylinder 66 mounting on bracket 41d. As cylinder 66 is energized, carriage 61 and member 62 reciprocate horizontally on shaft 42. Upward extending member 63 on the right end of carriage 61 also carries an outward extending horizontal stub shaft 64 (vertically aligned with shaft 42) received in a bearing (not shown) in bracket 41c. Thus shaft 64 prevents carriage 61 from rotating relative to shaft 42.

Other means may be employed to prevent rotation of carriage 61 relative to shaft 42. Among these are that the shaft may be non-circular, or splined or keyed or many other techniques well understood by machine designers. Further, cylinder 66 may be replaced by other well known means for reciprocating carriage 61.

Parallel, vertically disposed, Z-shaped anvil arms 73 are each pivoted by means of transverse horizontal pin 100 to member 62 and connected together by transverse arm 71. Each arm 73 has a slanted portion 68 which extends upwardly and forwardly relative to pin 72 and connected thereto is a downwardly-forwardly slanted arm portion 69. On the lower end of arm portion 69 is a spud 74 onto which the fitment 31 is deposited from fitment discharge box 46 when the arm 73 is in its upper position. Surrounding the inner end of spud 74 is a weld backup support 76 which engages the outside of flange 33 of fitment 31. Spud 74 and support 76 are integral and detachable from arm portion for special cleaning—an important requirement for sanitation. Further, since spud 74 and support 76 are integral, there are no spaces in which contaminants may collect.

Arms 73 are caused to oscillate swing about axis 150. Arm clevis 81 is attached to transverse arm 71. Link 82 is pinned at one end to clevis 81 and at the other to rod 84 of cylinder 83 fixed to carriage 61. Accordingly actuation of double-acting horizontal air cylinder 83 causes both arms 73 to swing between their various positions of movement about pin 150. The end 151 of arm 77, on the side of pin 150 opposite portions 68 and 69, functions to contact shock absorbers 78 and 79, both of which are mounted on carriage 61 and remote from cartons 21 so that failure of shock absorbers 78, 79 does not result in fluid leaking therefrom to contaminate the cartons.

In its upper position, each spud 74 receives a fitment 31 from cup 49 as cylinder 51 is actuated and then retracted. Cylinder 83 then causes arm 73 to move down so that the spuds 74 are horizontal. As shown in FIG. 4, by reason of the Z-shaped construction of arm 73, there is clearance for the portion 69 to enter through the open top of the carton 21. (It will be understood that the Z-shape of arms 73 is optional but presently preferred.) Thereupon cylinder 66 is actuated, causing first carriage 61 to move to the right from the position of FIG. 4 to move fitments 31 to the right so that spouts 32 project through panel holes 22 and flanges 33 engage the insides of walls 24.

Welding of Fitments to Cartons

A pair of second carriages 91a and 91b is mounted on the right hand side of the apparatus as viewed in FIG. 4. Each horn 98 is formed with a hollow shaped to receive the end of the fitment 31.

The end of horn 98 engages the outside of panel 24 opposite flange 33. Thus the carton 21 and flange 33 are clamped between weld backup 76 and the end of the horn. Energization of the horn 98 thereby welds the fitment to the carton. In the preferred embodiment shown, each horn 98 is mounted on a separate carriages 91a, and 91b each having upward arms 93 carrying sleeve bearings (not shown) slidable on shaft 42. To prevent rotation of carriages 91a, 91b around shaft 42, arms some 93 also have bearings engaging upper shaft 94 (vertically aligned with shaft 42) extending between brackets 41a and 41b. Each carriage 91a and 91b is attached to the outer end of rod 97 of individual pneumatic cylinders 96 fixed to bracket 41a. Depending from each carriage 91a, 91b and fixed thereto is an ultrasonic welding horn 98 and horn energizer 99 or transducer.

A single carriage may contain both horns 98. As stated above with respect to cylinder 66, cylinders 96 may be replaced with other reciprocating means. Anti-rotation means may be used other than upper shaft 94, as has been discussed in connection with carriage 61.

Horn 98 is supported in sleeve 101 depending from arm 102. To adjust horn 98 vertically and for concentricity to spud 74, arm 102 is adjustably mounted on carriage 91. Thus a slot 103 is formed in arm 102 to receive a shoulder bolt 104 to fix arm 102 to carriage 91. One or more ears 111 receive jacking screws 112 bearing against carriage 91. With bolts 152 loosened, adjustment of screws 112 enables arm 102 (and horn 98) to be moved relative to carriage 91. By unequal movement of screws 112, the slope of arm 102 and horn 98 relative to carriage 91 may also be adjusted for concentricity with spud 74. When adjustment is completed, bolt 152 is tightened.

Operation

At the commencement of the cycle, the conveyor 36 moves forwardly a distance of approximately seven inches during which time two cartons 21 to which fitments have already been applied are moved forwardly toward the fill station while two new cartons are moved into fitment application position. Presence of two cartons having been sensed by sensors 39 at previous station. During movement of the cartons to the fitment application position, arms 73 are in upward position with spuds 74 slanted upwardly 30° to the horizontal and in proximity to the fitment discharge nests 48. First carriage 61 is retracted (toward the left as viewed in FIG. 4) and second carriages 91 is also retracted (toward the right as viewed in FIG. 4). Cylinders 51 are energized to push fitments 31 held in cups 49 from nest 48 onto spuds 74. As the next pair of cartons 21 approach the fitment applying station, cylinder 83 is energized to lower arm 73 from loading position to applying position where the spuds 74 are horizontal. During this movement the fitments 31 and spuds 74 enter the open tops of cartons 21 and fitments 31 are horizontally aligned with the holes 22 in cartons 21. Second carriages 91 and then first carriage 61 advance under influence of cylinders 96, 96, and 66, respectively. Movement of carriage 61 causes the closures 34 to protrude through holes 22 and flanges 33 to engage the insides of panels 24. Movement of carriages 91 cause the end of horns 98 to engage the outsides of the panels 24, clamping the parts together. The horn transducers 99 are energized, causing the horns 98 to weld flanges 33 to panels 24 and then to hold to complete the weld. Reverse operations of cylinders 66, 96 and 83 thereupon causes first carriage 61 and second carriages 91 to retract to original positions and arms 73 to retract to initial position so that on the next cycle two more fitments may be applied to spuds 74. The cycle of operations is repeated.

If no cartons have been sensed by sensors 39, cylinders 51, 66, 83 and 96 are not energized and energizer 99 is not actuated for one cycle. If only one carton is sensed, the appropriate cylinders 51 and 96 and energizer 99 are not actuated for one cycle.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of simultaneously attaching a pair of fitments to a pair of vertical cartons positioned side-by-side on a conveyor wherein each said carton comprises a rectangular tube having a wall and an open upper end, said wall being formed with a hole and wherein each said fitment comprises a spout smaller than said hole and a peripheral flange at one end of said spout larger than said hole, said method comprising the steps of moving said cartons horizontally along a path substantially parallel to a first substantially vertical plane to a fitment application position, positioning said cartons stationary side by side in said fitment application position with said open ends exposed, moving a pair of oscillatory arms substantially parallel to a second substantially vertical plane transverse to said first plane, to a first arm position, each said arm having a spud, applying a fitment to each said spud while said arms are in first arm position, moving said arms substantially parallel to said second plane to a second arm position with said spuds and said fitments holding said spuds inside said cartons and said fitments aligned with said holes, said arms being angled to clear the upper ends of said tubes, moving a first carriage on which said arms are mounted horizontally substantially parallel to said second plane from a first carriage retracted position to a first carriage advanced position and thereby moving said fitments laterally so that said spouts protrude out through said holes and said flanges engage the insides of said walls, moving at least one second carriage on which is mounted a pair of annular welding heads substantially horizontally substantially parallel to said second plane from a second carriage retracted position to a second carriage projected position with each said head engaging a wall of one said tube and surrounding said hole, each said spout fitting inside one said welding head, clamping each said wall and one said flange between one said welding head and one said spud, and welding said flanges to said walls in a liquid-tight weld.

2. A method according to claim 1 further comprising feeding said cartons into said fitment application stage and retaining said cartons stationary until said welding step is completed.

3. A method according to claim 1 in which said first and second carriages are horizontally aligned for movement toward and away from each other.

4. A method according to claim 1 in which each said horn is horizontally aligned with one said spud when said arms are in second arm position.

5. A method according to claim 1 which further comprises providing a discharge box for fitments and a track for fitments leading into said box, said box being adjacent said spuds when said arms are in first arm position and which further comprises, placing fitments in said box, and moving a pair of fitments simultaneously from said box onto said spuds.

6. Apparatus for attaching a fitment to a carton wherein said fitment comprises a spout and a peripheral flange adjacent an end of said spout and said carton has an open top and a wall formed with an aperture and wherein said apparatus comprises a conveyor arranged to intermittently advance a vertical carton substantially horizontally parallel to a first substantially vertical plane to a fitment applying station and a base mountable on a filler machine at said fitment applying station, the improvement comprising a first carriage, first mounting means for mounting said first carriage on said base for reciprocation transverse to the path of movement of said cartons on said conveyor substantially parallel to a second substantially vertical plane transverse to said first vertical plane, first reciprocating means for reciprocating said first carriage substantially parallel to said second vertical plane, an arm, pivot means for pivoting said arm to said first carriage for movement substantially parallel to said second vertical plane, a spud on a distal end of said arm, said area extending upwardly and distally of said pivot means to clear said top edge of said carton when at said fitment applying station, oscillating means for oscillating said arm to move said spud between an applying position at the level of said aperture and an upwardly-outwardly slanted loading position and first anti-rotation means for said first carriage, a fitment discharge box mounted on said base to receive fitments from a source, said box having first and second aligned openings, a cylinder on said bracket having a plunger extending through said first opening to push a single fitment out of said box through said second opening onto said spud when said spud is in loading position, a welding horn at said fitment applying station in line with said spud when said spud is in applying position, a second carriage on which said horn is mounted, second mounting means for mounting said second carriage on said base for reciprocation transverse to the path of movement of said cartons on said conveyor and substantially horizontal parallel to said second vertical plane, second reciprocating means for reciprocating said second carriage, energizing means for said welding horn, and second anti-rotation means for said second carriage, said first carriage having a retracted position with said spud in applying position and inside said carton when in fitment applying position and an advanced position with said spout extending through said aperture and said flange against the inside of said wall, said horn having a retracted position and an advanced position with said horn against the outside of said wall surrounding said aperture.

7. Apparatus according to claim 1 wherein said conveyor advances a pair of cartons, a second carton of said pair being identical to said first-mentioned carton and wherein said improvement further comprises a second arm and a second spud substantially identical to said first-mentioned arm and spud, pivot means pivoting said second arm on said first carriage, second oscillating means for oscillating said second arm about said pivot means to move said second spud between applying position and loading position, said fitment discharge box receiving second fitments from said source and having third and fourth aligned openings, a second plunger extending through said third opening to push a single second fitment through said fourth opening onto said second spud when said second spud is in loading position and means for actuating said second plunger, a second welding horn in line with said second spud when second spud is in applying position, a third carriage on which said second welding horn is mounted, third mounting means for mounting said third carriage on said base for reciprocation transverse to the path of movement of said cartons on said conveyor means, means for reciprocating said third carriage and second energizing means for said second horn.

8. Apparatus according to claim 7 which further comprises means for connecting said first mentioned and second arms for movement together, said first mentioned and said second oscillating means comprising a double acting cylinder attached to said means for connecting.

9. Apparatus according to claim 8 in which said pivot means is removable from said first carriage, whereupon said first and second means and said means for connecting are removable from said carriage as a unit.

10. Apparatus according to claim 8 in which said cylinder is mounted on said first carriage.

11. Apparatus according to claim 1 which further comprises first and second shock absorbers engaged by said arm at applying position and loading position, respectively.

12. Apparatus according to claim 11 on which said first and second shock absorbers are mounted on said first carriage.

13. Apparatus according to claim 11 in which said first and second shock absorbers are remote from said fitment applying station.

14. Apparatus according to claim 1 in which said pivot means is located approximately at the level of said aperture.

15. Apparatus according to claim 14 in which when said spud is in applying position said arm extends upwardly-outwardly relative to said pivot means to a level above said top edge and then downwardly-outwardly so that said spud is inside said carton.

16. Apparatus according to claim 15 which further comprises a portion of said arm extending upwardly-inwardly relative to said pivot means when said spud is in applying position and which further comprises a shock absorber in contact with said portion of said arm.

17. Apparatus according to claim 1 in which said first mounting means is located above and transverse to the path of movement of cartons on said conveyor.

18. Apparatus according to claim 1 in which said first mounting means comprises a shaft, said first carriage sliding along said shaft.

19. Apparatus according to claim 18 in which said second mounting means is slidable on said shaft.

20. Apparatus according to claim 1 in which said first anti-rotation means comprises a second shaft attached to said first carriage and a bearing on said base to receive said second shaft for reciprocation of said second shaft relative to said bearing.

21. Apparatus according to claim 20 in which said second shaft is substantially vertically aligned with said first shaft.

22. Apparatus according to claim 1 in which said second anti-rotation means comprises a second shaft attached to said base and a bearing attached to said second carriage sliding along said second shaft.

23. Apparatus according to claim 22 in which said second shaft is substantially vertically aligned with said first shaft.

24. Apparatus according to claim 1 in which said spud has a weld back-up integral therewith adjacent said arm, said spud and said weld back-up being removable from said arm as a unit.

25. Apparatus according to claim 1 in which said oscillating means comprises an oscillating cylinder mounted on said first carriage having a rod, a link pivoted at one end to said rod and pivoted at another end to said arm.

26. Apparatus according to claim 1 in which said fitment discharge box comprises a chute to hold said fitments in a stack with said flanges of said stack tangent, said chute having aligned first and second openings at the bottom of said chute transverse to said flanges, a plunger fitting through said first hole, and means for reciprocating said plunger to force the bottommost fitment in said stack out through said second hole.

27. Apparatus according to claim 26 in which said chute comprises a bracket fixed to said base and a nest shaped to receive said stack of fitments, said nest being removably attached to said bracket.

28. Apparatus according to claim 26 which further comprises a cup on said plunger, said cup being open remote from said plunger and at its top whereby the lowermost fitment fits into said cup and is supported thereby from falling.

29. Apparatus according to claim 28 which further comprises cooperating means on said cup and said chute to restrain rotation of said cup relative to said chute.

30. Apparatus according to claim 28 in which said cup has a tail and in which said chute has a bottom formed with a groove receiving said tail whereby said cup may reciprocate relative to said chute without rotation of said cup.

31. Apparatus according to claim 1 in which said second mounting means comprises a sleeve receiving said horn and an arm fixed relative to said sleeve, means mounting said arm on said second carriage for adjustment of said horn relative to said second carriage.

32. Apparatus according to claim 31 in which said means mounting said arm is adjustable vertically relative to said second carriage and also angularly relative to said second carriage.

33. Apparatus according to claim 1 which said second mounting means comprises a shaft mounted on said base and a pair of mounting arms fixed to said second carriage and slidable on said shaft.

34. Apparatus according to claim 33 which further comprises a second shaft mounted on said base, at least one of said mounting arms being slidable on said second shaft to restrain rotation of said second carriage relative to said base.

35. Apparatus according to claim 33 which further comprises a second welding horn substantially parallel to said first-mentioned horn, a third carriage on which hid second horn is mounted and a second pair of mounting arms fixed to said third carriage and slidable on said shaft.

36. Apparatus according to claim 25 which further comprises third reciprocating means mounted on said base for reciprocating said third carriage independently of said second reciprocating means.

37. For use in apparatus for attaching fitments to each of a pair of vertical cartons wherein each said fitment has a spout and a peripheral flange adjacent an end of each spout and each carton has an open top and a wall formed with an aperture and wherein said apparatus has a base mountable on a filler machine at said fitment applying station and wherein the vertical cartons advance along a conveyor substantially parallel to a first substantially vertical plane, a fitment handling mechanism comprising, a carriage, mounting means for mounting said carriage on said base for reciprocation transverse to the path of movement of said cartons on a conveyor substantially horizontally parallel to a second substantially vertical plane transverse to said first plane, reciprocating means for reciprocating said carriage for movement substantially parallel to said second plane, a first arm, pivot means for pivoting said first arm to said carriage for movement substantially parallel to said second plane, a first spud on a distal end of said first arm, said first arm extending upwardly and distally of said pivot means to clear said top of one said carton when at said fitment applying station, first oscillating means for oscillating said first arm to move said first spud between an applying position at the level of said aperture and an upwardly-outwardly slanted loading position, a second arm and a second spud substantially identical to said first-mentioned arm and first spud, said pivot means pivoting said second arm on said carriage, second oscillating means for oscillating said second arm about said pivot means to move said second spud between applying position and loading positions.

38. Mechanism according to claim 37 which further comprises means for connecting said first and second arms for movement together, said first and said second-oscillating means comprising a double acting cylinder attached to said means for connecting.

39. Mechanism according to claim 38 in which said pivot means is removable from said carriage, whereupon said first and second means and said means for connecting are removable from said carriage as a unit.

40. Mechanism according to claim 39 which further comprises first and second shock absorbers engaged by said arm at applying position and loading position, respectively, said first and second shock absorbers being mounted on said carriage remote from said fitment applying station.

41. Mechanism according to claim 38 in which said pivot means is located approximately at the level of said aperture.

42. Mechanism according to claim 41 in which when said spuds are in applying position said arms extend upwardly-outwardly relative to said pivot means to a level above said top edges and then downwardly-outwardly so that said spuds are inside said carton.

43. Mechanism according to claim 37 which further comprises a shaft attached to said carriage and a bearing on said base to receive said shaft for reciprocation of said second shaft relative to said bearing to restrain rotation of said carriage relative to said mounting means.

44. For use with apparatus for attaching a fitment to a carton wherein said fitment has a spout and a peripheral flange adjacent an end of said spout and said carton has an open top edge and a wall formed with an aperture and wherein said apparatus has a base mountable on a filler machine at said fitment applying station, the mechanism comprising a chute to hold said fitments in a stack with said flanges of said stack tangent, said chute having aligned first and second openings at the bottom of said chute transverse to said flanges, a plunger fitting through said first hole, means for reciprocating said plunger to force the bottommost fitment in said stack out through said second hole.

45. Mechanism according to claim 44 in which said chute comprises a bracket fixed to said base and a nest shaped to receive said stack of fitments, said nest being removably attached to said bracket.

46. Mechanism according to claim 44 which further comprises a cup on said plunger, said cup being open remote from said plunger and at its top whereby the lowermost fitment fits into said cup and is supported thereby from falling.

47. Mechanism according to claim 46 in which said cup has a tail and in which said chute has a bottom formed with a groove receiving said tail whereby cup may reciprocate relative to said chute without rotation of said cup.

48. For use in apparatus for attaching a fitment to a carton wherein said fitment has a spout and a peripheral flange adjacent an end of said spout and said carton has an open top edge and a wall formed with an aperture and wherein said apparatus has a base mountable on a filler machine at said fitment applying station welding mechanism, a welding horn, a carriage on which said horn is mounted, mounting means for mounting said carriage on said base for reciprocation transverse to the path of movement of said cartons, reciprocating means for reciprocating said carriage, and energizing means for said welding horn, said second mounting means comprising a sleeve receiving said horn and an arm fixed relative to said sleeve, and means mounting said arm on said second carriage for adjustment of said horn relative to said second carriage.

49. Mechanism according to claim 48 in which said means mounting said arm is adjustable vertically relative to said second carriage and also angularly relative to said second carriage.

50. Mechanism according to claim 49 in which said mounting means comprises a shaft mounted on said base and a pair of mounting arms fixed to said carriage and slidable on said shaft.

51. Mechanism according to claim 50 which further comprises a second shaft mounted on said base, at least one of said mounting arms being slidable on said second shaft to restrain rotation of said carriage relative to said base.

52. Mechanism according to claim 50 which further comprises a second welding horn substantially parallel to said first-mentioned horn, a second carriage on which said second horn is mounted and a second pair of mounting arms fixed to said second carriage and slidable on said shaft.

53. Mechanism according to claim 52 which further comprises second reciprocating means mounted on said base for reciprocating said second carriage independent of said first reciprocating means.

* * * * *